(12) United States Patent
Tomani et al.

(10) Patent No.: US 9,617,393 B2
(45) Date of Patent: Apr. 11, 2017

(54) METHOD OF PRODUCING LIGNIN WITH REDUCED AMOUNT OF ODOROUS SUBSTANCES

(71) Applicant: Innventia AB, Stockholm (SE)

(72) Inventors: Per Tomani, Huddinge (SE); Fernando Alvarado, Stockholm (SE)

(73) Assignee: INNVENTIA AB, Stockholm (SE)

( * ) Notice: Subject to any disclaimer, the term of this patent is extended or adjusted under 35 U.S.C. 154(b) by 0 days.

(21) Appl. No.: 14/940,376

(22) Filed: Nov. 13, 2015

(65) Prior Publication Data

US 2016/0177040 A1    Jun. 23, 2016

(30) Foreign Application Priority Data

Dec. 22, 2014 (SE) ...................................... 1451641

(51) Int. Cl.
| | | |
|---|---|---|
| C07G 1/00 | (2011.01) | |
| C08H 7/00 | (2011.01) | |
| B01D 11/00 | (2006.01) | |
| C09J 197/00 | (2006.01) | |
| C08L 97/00 | (2006.01) | |

(52) U.S. Cl.
CPC ............... C08H 6/00 (2013.01); B01D 11/00 (2013.01); C08L 97/005 (2013.01); C09J 197/005 (2013.01); *B01D 2257/306* (2013.01)

(58) Field of Classification Search
CPC .... C08H 6/00; B01D 11/00; B01D 2257/306; C08L 97/005; C09J 197/005
See application file for complete search history.

(56) References Cited

U.S. PATENT DOCUMENTS

| | | | |
|---|---|---|---|
| 2,744,927 | A | 5/1956 | Copenhaver et al. |
| 4,265,809 | A | 5/1981 | Holsopple et al. |
| 4,764,596 | A | 8/1988 | Lora et al. |
| 2003/0221804 | A1 | 12/2003 | Lightner |

(Continued)

FOREIGN PATENT DOCUMENTS

| | | |
|---|---|---|
| JP | 2013035886 A | 2/2013 |
| WO | 2006031175 A1 | 3/2006 |
| WO | 2012161865 A1 | 11/2012 |

(Continued)

OTHER PUBLICATIONS

International Search Report issued in PCT/SE2015/051214 dated Mar. 9, 2016, 5 pages.

(Continued)

*Primary Examiner* — Liam J Heincer
*Assistant Examiner* — Nicholas Hill
(74) *Attorney, Agent, or Firm* — Pearne & Gordon LLP

(57) ABSTRACT

The present invention relates to a method of producing lignin with reduced amount of odorous substances comprising the steps of:
  i) dissolving isolated lignin into an alkali solution;
  ii) adding to the solution $C_1$-$C_4$-alcohol in an amount of less than 30% by weight, based on the dry weight of the isolated lignin; and
  iii) re-precipitating lignin by acidifying the solution.

The invention also relates to a lignin product with reduced odor obtained and/or obtainable by the method and to the use of the obtained lignin as a component in polymer blends, an additive or filler in building materials, as binding agent in adhesives, and/or for the production of a carbon fiber, especially in indoor applications.

14 Claims, 4 Drawing Sheets

(56) References Cited

U.S. PATENT DOCUMENTS

2013/0217869 A1   8/2013  Ters et al.
2014/0288285 A1   9/2014  Ters et al.

FOREIGN PATENT DOCUMENTS

WO    2013083876 A2   6/2013
WO    2013182751 A1   12/2013
WO    2014116173 A1   7/2014

OTHER PUBLICATIONS

Ponomarkenko, Jevgenija, et al, "Characterization of Softwood and Hardwood LignoBoost Kraft Lignins with Emphasis on their Antioxidant Activity," Bioresources, vol. 9, No. 2, pp. 2051-2068, 2014.
Morck, Roland, et al, "Fractionation of Kraft Lignin by Successive Extraction with Organic Solvents," Holzforschung, vol. 42, No. 2, pp. 111-116, 1988.
Intention to Grant for related Swedish Appl. No. 1451641-3, including claims in English, dated Jun. 25, 2015, pp. 1 (3) to 3 (3), application pp. 1-19, and figure pp. 1-4.
Decision to Grant for related Swedish Appl. No. 1451641-3, dated Feb. 18, 2016, pp. 1-2.
Information on Grant of a Patent for related Swedish Appl. No. 1451641-3, dated Aug. 23, 2016, p. 1.

METHOD OF PRODUCING LIGNIN WITH REDUCED AMOUNT OF ODOROUS SUBSTANCES

TECHNICAL FIELD

The present invention relates to a method of producing lignin from pulp mill liquors with reduced amount of odorous substances, to a lignin product obtained and to a use of the lignin product.

BACKGROUND ART

Lignin is a complex polymer occurring in certain plant walls making the plant rigid. Bonds lignin to cellulose are broken during a chemical pulping process. Lignin isolation from black liquor has been used during past years to provide lignin for commercial use, for example for use as a solid biofuel and dispersant. This lignin is also a valuable material for production of "green chemicals" and as a fuel for the production of chemicals. The production process of lignin of that kind is described for example in WO2006/031175. According to the process, lignin is separated from black liquor. The separation method may include steps to acidify the black liquor so that the lignin is precipitated. The solid phase is then separated from the liquor and can thereafter be cleaned or modified.

However, there is a desire to use lignin products also in other applications than fuel applications. The lignin product obtained by the isolation process is a renewable, non-poisonous environmentally friendly product which could be used for example as a raw material for building materials. However, the obtained lignin product suffers from a drawback of being malodorous, whereby the use of the product has been limited to few applications. There is thus a great desire to reduce or eliminate the problems with odor in lignin products.

In the prior art, there have been attempts to reduce odour levels in lignin products. WO2012161865 discloses a method in which pressurized black liquor may be reacted with an oxidizing agent, such as oxygen, peroxide or the like, in an amount sufficient to reduce or eliminate the odor level in the black liquor so that there will be little or no odor in the final lignin product. This step removes the odors by oxidating mercaptans (methyl, ethyl), and dimethyl, diethyl sulphides etc. However, with this process there is a risk that also lignin is oxidized and thus deteriorated or chemically modified.

Even though there are prior art solutions for the reduction of odor levels, especially in respect of mercaptans, there is still a need for a process that removes other organic odorous compounds effectively. There is also a need for a process in which lignin is affected as little as possible and in which lignin is not essentially fractionated by the odour reduction process. There is also need for an environmentally friendly process with a reduced risk for hazards in the production process. There is also a need for a process which can be integrated with the present lignin separation processes in a simple way. Further there is a need to use environmentally friendly products throughout the process for the isolation of lignin.

SUMMARY OF THE INVENTION

The object of the present invention is to provide a method for reducing the amount of odorous substances in lignin products. It is also an object with the present invention to provide a method for the production of a product in which lignin is affected as little as possible and in which lignin is not essentially fractionated due to odour reduction. It is also an object to provide a method for producing less odorous lignin products with a method that can result in high yield. It is a further object to provide a method which is environmentally friendly and which can be added and/or integrated with available processes for separating lignin, i.e. the production of lignin products.

The objects above are achieved with the present method of producing lignin wherein lignin with reduced amount of odorous substances is obtained. The method comprises the steps of:
  i) dissolving isolated lignin into an alkali solution;
  ii) adding to the solution $C_1$-$C_4$-alcohol in an amount of less than 30% by weight, based on the dry weight of the isolated lignin; and
  iii) re-precipitating lignin by acidifying the solution.

By dissolving the isolated lignin and then by adding the alcohol in the amount of less than 30% by weight, i.e. in an amount of less than and not including 30% by weight, an extraction of the odorous substances occurs while lignin in itself is affected as little as possible. The amount of $C_1$-$C_4$-alcohol added is preferably from 0.5 to 20% by weight, whereby lignin is affected minimally while extraction of odorous substances is still effective. Thus, lignin is substantially not fractionated due to alcohol addition and a very high yield of lignin can still be obtained.

To provide a product useful in different applications, the method can further comprise the steps of:
  iv) dewatering and/or filtrating the re-precipitated lignin;
  v) washing the precipitated lignin; and
  vi) drying the precipitated lignin.

The dried lignin from the step vi) can be thus used as such for different applications such as filler for building and construction materials, also aimed for in-house applications due to the reduced or eliminated odour.

The lignin in step i) can be lignin isolated from black liquor in an alkaline chemical pulping process. The black liquor can be soda or kraft black liquor.

The isolated lignin can be obtained from a process comprising the steps of:
  a) precipitating lignin by acidifying black liquor obtained from the alkaline chemical pulping process;
  b) dewatering and/or filtrating the obtained lignin to provide a filter cake;
  c) re-suspending the lignin;
  d) adjusting the pH of the obtained suspension in step c) to a pH lower than 6;
  e) dewatering and/or filtrating the acidic suspension from step d) to provide a filter cake; and
  f) washing and dewatering the filter cake.

Preferably, pH in step d) is adjusted to be lower than 4, such as equal with or lower than 3.5, e.g. 2-2.5, so that as much lignin as possible is re-suspended and thus a high yield and good filtration properties in the following filtration operations e) and f) can be obtained.

Prior to the step a), the process may comprise a pre-step in which black liquor is fractionated. This can be done by means of filtration by for example membrane filtration such as micro- and ultra-filtration. By such mechanical separation it is possible to separate for example particulate material, hemicelluloses and/or it is possible to mechanically fractionate lignin and to obtain a specific fraction of lignin. In this way it is possible to obtain at least partially purified starting material and/or lignin fraction while high yield can be obtained since lignin is not substantially chemically affected. Another way to achieve fractions of lignin is a fractionation by means of different pH levels and select lignins from a certain pH-window for further processing.

Herein, by a filter cake is meant a filter cake comprising or consisting of lignin. The washed filter cake can be directly used in step i) above, and the method of producing lignin with reduced odour, i.e. the odour-treatment, can be integrated into the process for obtaining lignin from black liquor. In this way energy savings are possible, since lignin needs not to be dried before the odour treatment. However, it is also possible to dry the lignin as a last step in the process for obtaining lignin, wherein the process further comprises the step of:

g) drying the filter cake.

By dewatering and drying the filter cake it will be easy to transport and thus for example the odour treatment can be made in another factory.

To further increase odour reduction the process for obtaining lignin, also called for lignin separation or isolation process, can also comprise the step of adding a $C_1$-$C_4$-alcohol in an amount of less than 30% by weight, based on the dry weight of the isolated lignin, prior to, during or after precipitation in step a), and/or adding a $C_1$-$C_4$-alcohol prior to, during or after at least one of the dewatering and/or washing steps b), e) and f) to reduce the amount of odorous substances. By the addition of alcohol during the lignin separation, the odour reduction may be further improved.

The $C_1$-$C_4$-alcohol can be added in the process in an amount of 0.5 to 20% by weight, based on the dry weight of the isolated lignin, whereby lignin in itself is affected as little as possible, and essentially no fractionation of lignin is occurred.

Preferably, lignin in step i) is obtained from kraft pulping process. Kraft pulping process has been found to be especially suitable for lignin separation, as disclosed e.g. by "Tomani, Per; The Lignoboost Process; Cellulose Chem Technol., 44(1-3), 53-58 (2010).

The present method of producing lignin with reduced amount of odorous substance results in yield which is over 80% by weight, based on the weight of the isolated lignin before the treatment. Preferably, the yield is over 85%. Thus, the method leads only to minor material losses.

The odorous substances that are extracted with the present method comprise at least one of dimethydisulphide, dimethyltrisulphide, dimethyltetrasulphide, guaiacol, ethylguaiacol and other phenolic compounds. These substances cause very bad odour which has made lignin products difficult to use in indoor applications. Also other odorous substances, e.g. organic substances having low concentrations, can be extracted by means of the present method. The concentration of the odorous substances is reduced by at least 50%, the concentration being calculated from a peak area of a respective peak in a chromatogram. Preferably, the concentration of the odorous substances is reduced by at least 70%.

The method also preferably comprises at least partially recirculating the $C_1$-$C_4$-alcohol back into process and thus cost savings can be obtained while the process can be made more environmentally friendly.

Preferably, the $C_1$-$C_4$-alcohol is ethanol. Ethanol effectively dissolves organic malodorous substances, and especially guaiacol dissolves better in ethanol than in other alcohols whereby the use of ethanol is especially advantageous.

The present invention also relates to a lignin product with reduced odor obtained and/or obtainable by the above-defined method. The yield of the obtained lignin is more than 80% by weight, based on the weight of the isolated lignin before steps i)-iii). Also, the concentration of the odorous substances in the obtained lignin product is at least 50% less and preferably less than 70% than in a corresponding untreated lignin, the concentration being calculated from a peak area of a respective peak in a chromatogram. Thus, the odour problems in connection with lignin products have been reduced substantially.

The present invention also relates to a use of the lignin product as defined above as a component in polymer blends, additive or filler in building materials, as binding agent in adhesives, and/or for the production of a carbon fiber. The lignin product can also be used in building and construction materials that are intended for use indoors. Further application areas are for example manufacturing of fibre boards, car panels, as a cross-linking agent in vehicle tyres, as antioxidants and as UV-protectors. The application areas are not limited to the above-mentioned areas, other application areas are possible.

Further objects, features and advantages of the present invention will be described with reference to the detailed description below and to the appended drawings.

DETAILED DESCRIPTION

Figure 1:
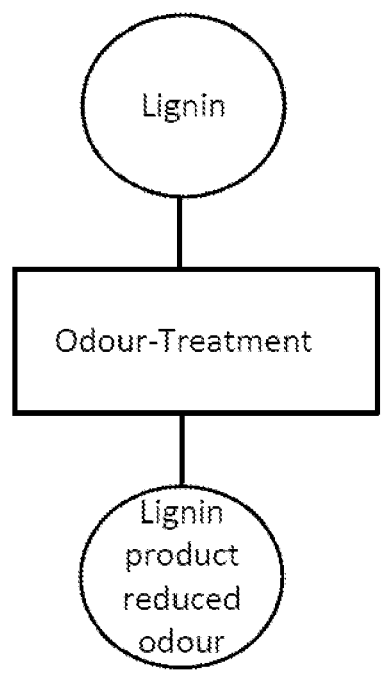
FIG. 1 shows a flow chart illustration of the method according to the invention.

In the method of the present invention, which is schematically illustrated in a flow chart in FIG. 1, isolated lignin is treated to obtain a lignin product with reduced odour. By "lignin" is meant any lignin, which may be pure lignin or lignin with small amounts of impurities. According to the present method, the amount or concentration of the odorous substances can be reduced in lignin products while it is possible to obtain high yield of lignin. The less odorous or substantially odourless lignin product can be used in a wide range of applications including indoor applications which is a huge advantage.

Lignin to be treated by the present method is according to one aspect obtained as a by-product from an alkaline chemical pulping process. The alkaline chemical pulping process is preferably sulphate, also called kraft, process or soda process. Both processes result in alkaline liquor containing dissolved lignin. By kraft pulping process is meant a treatment of fibre-based material by cooking the fibre-based material in white liquor at a cooking temperature of from about 130-200° C. to make lignin soluble in the cooking liquor. White liquor is a mixture of sodium hydroxide and sodium sulphide. By black liquor is meant the cooking liquor obtained during cooking from the alkaline chemical pulping process. Black liquor contains residues of white liquor and other pulping chemicals, lignin, hemicelluloses and other extractives from the fibre-based material.

The fibre-based material useable in this invention can be softwood, hardwood or non-wood, such as annual plants. The softwood tree species can be for example, but are not limited to: spruce, pine, fir, larch, cedar, and hemlock. Examples of hardwood species from which pulp useful as a starting material in the present invention can be derived include, but are not limited to: birch, oak, poplar, beech, eucalyptus, acacia, maple, alder, aspen, gum trees and gmelina. Preferably, the fibre-based material mainly comprises softwood. The fibre-based material may comprise a mixture of different softwoods, e.g. pine and spruce. The fibre-based material may also comprise a non-wood raw material, such as bamboo and bagasse. The fibre-based material may also be a mixture of at least two of softwood, hardwood and/or non-wood.

The amount of odorous or odour containing substances can be reduced in the lignin product by means of extracting. Especially, organic malodorous substances can be extracted by the present method. Extracting is suitably selective, meaning that substantially mainly the odorous or odour containing substances are extracted. The extraction is obtained by means of the combined dissolution of lignin in alkali and the addition of $C_1$-$C_4$-alcohol to the solution. By $C_1$-$C_4$-alcohol is meant methanol, ethanol, propanol, isopropanol, n-butanol, sec-butanol, tert-butanol or mixtures thereof. The odorous substances are extracted in alcohol, suitably methanol, ethanol, propanol, isopropanol or butanol, from the dissolved lignin. The amount of the alcohol to be added should be kept as low as possible, so that lignin is affected as little as possible. Thus, the amount of alcohol to be added is less than 30% by weight and can be from about 0.5 to about 0% by weight, based on the dry weight of lignin. The alcohol including the extracted odorous substances is removed from the process and optionally recirculated at least partly back in the process.

Figure 2:
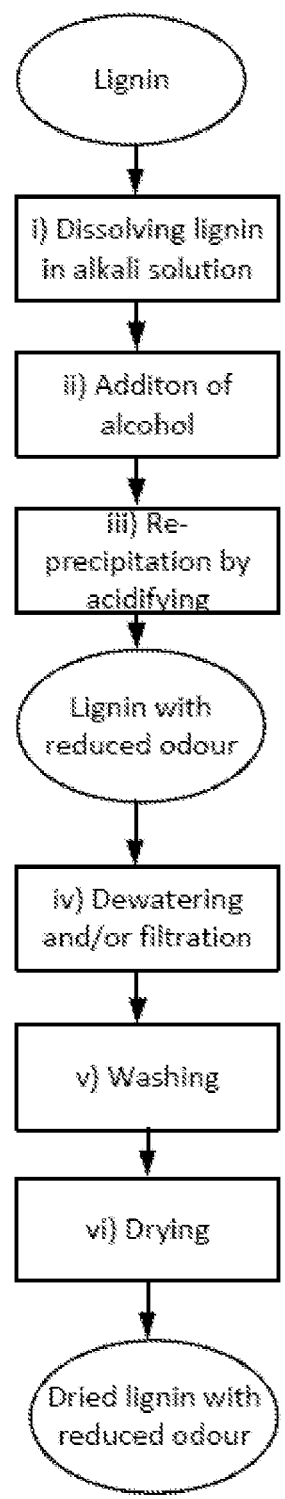
FIG. 2 shows a more detailed flow chart illustration of an example method according to the present invention.

Reference is now made to FIG. 2 in which the method according to the present invention is schematically illustrated more in detail. As can be seen, before alcohol addition in step ii), lignin is dissolved in an alkali solution, such as NaOH, in step i). The pH of the solution is adjusted to about 11-13 to ensure that substantially all lignin is dissolved.

After alcohol addition in step ii), the method may comprise a maturing period of desired length (not shown in FIG. 2). The maturing period can be for example from 10 minutes to one hour, but is not limited to these periods and can be adjusted by the skilled person to different processes and needs. After the optional maturing, lignin is re-precipitated by acidification in step iii) during which pH is adjusted to about 2-4 to ensure that substantially all lignin is re-precipitated. Acidifying and pH adjustment can be performed by adding $SO_2$ as gas, organic acids, HCl, $HNO_3$, carbon dioxide or sulphuric acid. Mixtures of the different acids thereof can also be used. The acid can be for example sulphuric acid which is commonly used in paper making processes.

The re-precipitated lignin has a reduced concentration of odorous substances. However, in most applications the re-precipitated lignin needs to be transported so that lignin can be used in different applications and thus dewatering and possibly filtering, washing and drying of lignin is required. As further illustrated in FIG. 2, the method can thus comprise a step iv) in which lignin in the form of a filter cake is dewatered and/or filtrated. Dewatering can be performed by any means to withdraw water. For example, the dewatering is performed by using centrifugation, a filter press apparatus, a band filter, a rotary filter, such as a drum filter, or a sedimentation tank, or similar equipment. Filtration can be performed by using any conventional apparatus suitable for filtration, such as filter press or a band filter. The filtrate from the dewatering step can be re-circulated to a recovery system, and the alcohol can be further recirculated back in the process. Subsequent to dewatering and/or filtration, the obtained lignin in the form of a filter cake is washed in step v). Washing can be performed by using water and/or small amounts of alcohol, i.e. 1-10% by weight, based on the weight of lignin, such as ethanol. Also during the wash, it is advantageous if the pH is kept acidic, such as from pH 1.5 to pH 5, preferably from pH 1.5 to pH 3.5. In this way the yield of lignin can be further increased. After washing, the obtained filter cake is dried in step vi) and a final lignin product with reduced odour is obtained.

Figure 3:
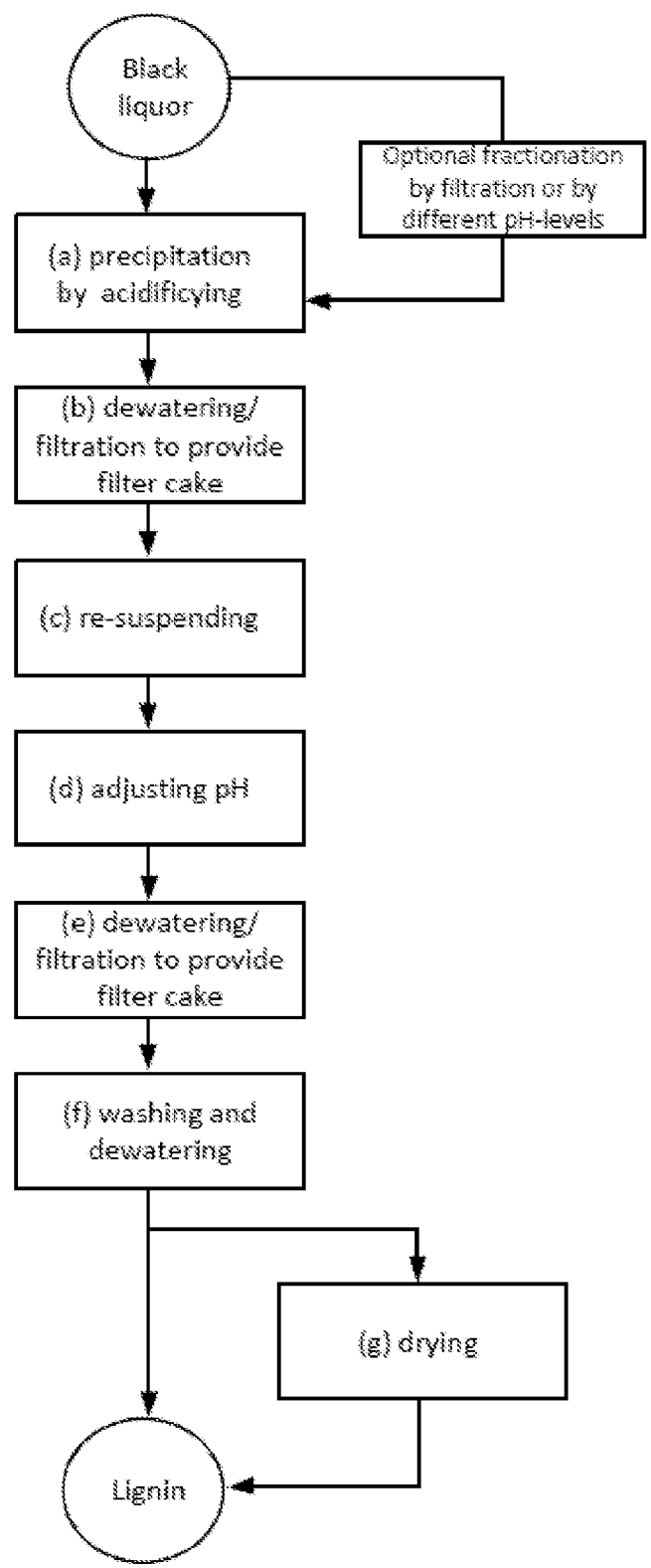
FIG. 3 shows a flow chart illustration of a process for lignin isolation.

Lignin to be treated according to the present invention can be obtained from a process for separation or isolation of lignin which is illustrated in the flow chart of FIG. 3, and which is also commercially called for LignoBoost® process. In step a) of the process lignin is precipitated by acidifying black liquor obtained from an alkaline chemical pulping process. The chemical process is preferably kraft process. Acidifying can be performed by any means sufficient to acidify black liquor. Preferably the acidifying is performed by adding $SO_2$ (gas), HCl or sulphuric acid, or mixtures thereof to said black liquor. Carbon dioxide or sulphuric acid are the preferred alternatives since these acids are commonly used in paper making processes and by using these acids it is possible to obtain high yield. By using carbon dioxide in step a) so as to acidify the black liquor approximately to a pH between 11.5 and 9, normally around pH 10, a lignin product can be obtained. The product can be used as fuel or for the production of chemicals and has reasonably low ash content and a low tendency to cause corrosion. Prior to step a), the process optionally comprises a pre-step in which black liquor can be filtrated for example by membrane filtration. By this mechanical separation it is possible to separate for example particulate material, hemicelluloses and/or it is possible to mechanically fractionate lignin and to obtain a specific fraction of lignin. Another way to achieve fractions of lignin is fractionation by different pH levels and select lignins from a certain pH-window for further processing.

In the step b) as illustrated in the flow chart, the obtained lignin is dewatered and/or filtrated in a first dewatering and/or filtration step. Also in this connection the dewatering may be performed by any means to withdraw water, for example by using centrifugation, a filter press apparatus, a band filter, a rotary filter, such as a drum filter, or a sedimentation tank, or similar equipment. For example, when using a filter press apparatus the filter cake obtained through dewatering may be blown through by gas or a mixture of gases, preferably compressed air in order to dispose of the remaining liquid, such as black liquor, before re-suspending the obtained cake as set out in step c). The filtrate from the dewatering step can be re-circulated to the pulp mill black liquor recovery system. The pH level adjustment before dewatering/filtration, made by addition of acid preferably $CO_2$ (g), can be combined with an adjustment of ion strength, preferably by using alkali metal ions or multivalent alkaline earth metal ions, most preferred calcium ions. Higher ion strength gives at a given pH lower yield losses of lignin as the lignin becomes more stable.

Thus, the step c) comprises re-suspending the lignin to form a suspension. Generally by a suspension is meant a heterogeneous mixture containing liquid and small solid particles, such as about 1 µm or larger. The particles in the suspension are able to settle whereby it is possible to obtain a filter cake. The re-suspension may suitably take place at a temperature of from 30 to 70° C.

In the step d), the pH level is preferably adjusted to below approximately pH 6, and suitably below approximately pH 4, and preferably below 3.5, e.g. 2-15. The pH level is preferably from pH 1.5 to pH 3.5 to ensure that substantially all lignin is re-suspended and to give good filtration properties in the following dewatering/filtration step. It is also important in order to isolate a lignin with low content of inorganics. Acidifying can be performed with the same chemicals as in connection with acidifying black liquor and as described above.

After acidifying, a second dewatering and/or filtration step e) is performed similarly as the above-defined step b).

In step f), the obtained filter cake is washed and the washing liquid, such as acidified water, can have a pH level of below approximately pH 6, preferably below approximately pH 4. The pH level is most preferred a pH from 1.5 to 3.5. The washing liquid is dewatered and in one embodiment of the invention, the obtained filter cake is treated with the method steps i)-iii) without drying the filter cake before the treatment.

According to another embodiment the method further comprises the step g) of drying the filter cake, whereby the filter cake can be easily e.g. transported.

The filter cake obtained from the final dewatering step above in connection with the method of treating lignin to reduce odorous substances or in the process to provide lignin to be treated can be pressed to a high dry content and the remaining washing liquor in the filter cake is preferably removed with air or flue gases from e.g. a recovery boiler or bark boiler. The latter also makes it possible to obtain a drier lignin. The washing liquor and a part of the filtrate from the second filtration can preferably be returned to the re-suspending step c) to further reduce the consumption of acid and water.

Figure 4:
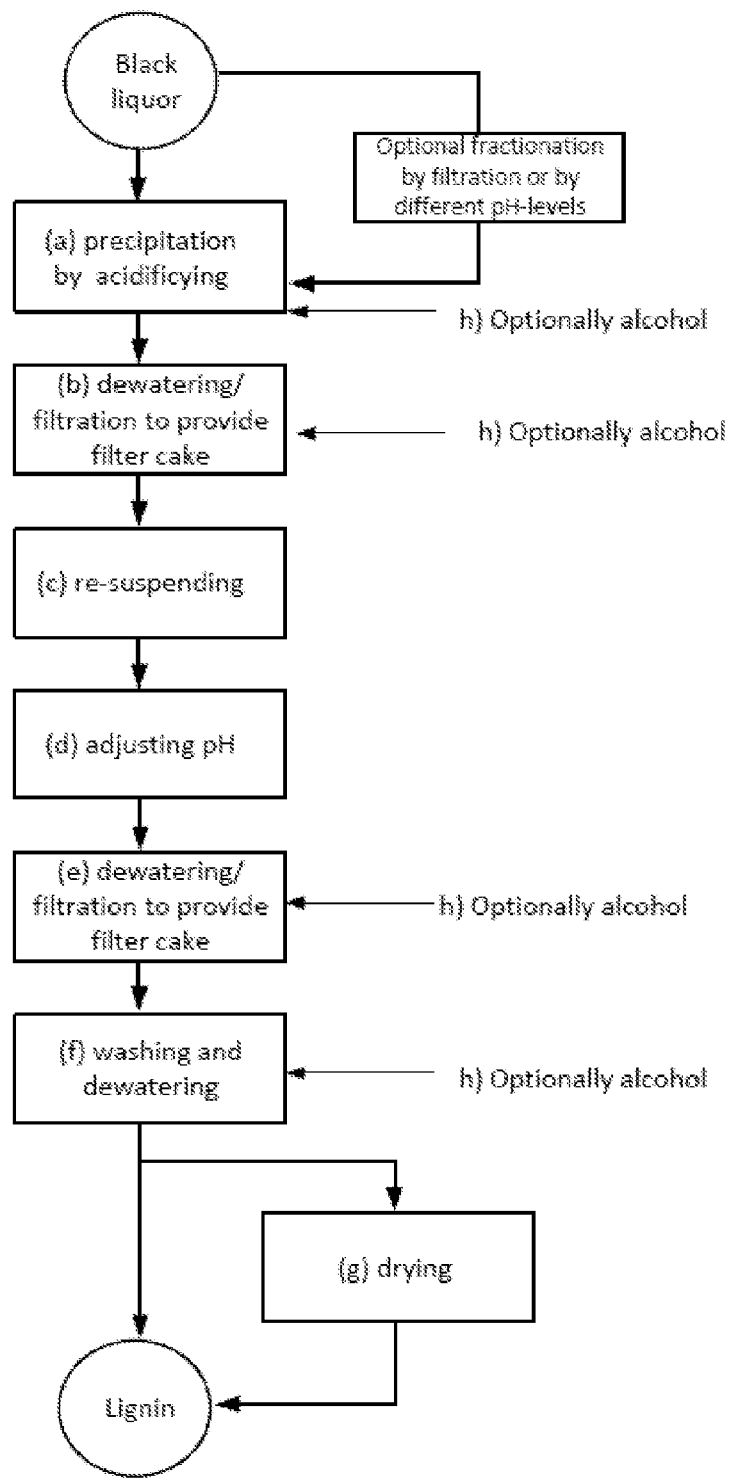
FIG. 4 shows a flow chart illustration of a process for lignin isolation including alcohol addition steps.

In FIG. 4 another embodiment of the invention is schematically illustrated by a flow chart. FIG. 4 illustrates the same process to separate lignin from black liquor as FIG. 3. However, in the process $C_1$-$C_4$-alcohol, preferably ethanol, is added in an optional step h) already during the isolation process to further decrease the amount or concentration of odorous substances. The alcohol may alternatively or additionally be added before, during or subsequent the precipitation step a). The alcohol may also be added during the first dewatering/filtration step b) and/or during the second dewatering/filtration step e) and/or during the washing/dewatering step f). The alcohol may be recirculated back into process.

With the present method of producing lignin with reduced amount of odorous substances it is possible to obtain high yield, such as over 80% by weight, based on the weight of the isolated start lignin. Even higher yields are possible, such as over 85% and up to about 90-95%. Thus, the method leads only to minor material losses which is a major advantage. The high yield can be obtained due to the fact that the extraction method is rather moderate meaning that substantially no fractionation of the lignin occurs due to odour reduction process. Mainly only odorous substances, especially organic odorous substances, are extracted. The odorous substances that are extracted with the present method comprise at least one of dimethydisulphide, dimethyltrisulphide, dimethyltetrasulphide, guaiacol, ethylguaiacol and other phenolic compounds. These substances lead to malodourous gases which have made lignin products difficult to use in indoor applications. The concentration of the odorous substances is reduced by at least 50%, the concentration being calculated from a peak area of a respective peak in a chromatogram. Preferably, the concentration of the odorous substances is reduced by at least 70%. Thermogravimetry analysis (TGA) of the lignin product produced by the present process shows that the lignin is essentially not affected by the present process. This further supports the conclusion of the present invention that the present process is gentle towards lignin, while the odorous substances can be reduced effectively.

Due to the obtained odour reduction, the lignin product is possible to use in many applications. For example lignin can be used as a component in polymer blends, an additive or filler in building materials, as binding agent in adhesives, and/or for the production of a carbon fiber. The lignin product can also be used in building materials that are intended for use indoors. Further application areas are for example manufacturing of fibre boards, as a cross-linking agent in vehicle tyres, as antioxidants and as UV-protectors. The application areas are not limited to the above-mentioned areas, other application areas are possible.

The invention is further described in the following example.

EXAMPLE

The precipitation experiments were carried out at atmospheric pressure in a tank reactor equipped with baffles. When the target temperature was reached, carbon dioxide was bubbled through the black liquor via a sparser located underneath the impeller (a Rushton turbine) in order to acidify the black liquor. The carbon dioxide flow was stopped when the target pH (approximately 10) was reached.

When the slurry had reached the desired pH, the stirring rate was decreased and the slurry was allowed to mature for 30 minutes. After maturing, the lignin slurry was transferred to the test filter equipment. The suspension was filtered at constant pressure and the filtration time and filtrate weight was recorded during the whole filtration. The formed lignin cake was weighed and the dry solids content was measured. Sample of the lignin-lean filtrate was taken for analyses of dry solids, density and viscosity.

The filter cake obtained from the first separation step was re-dispersed in water and pH-adjusted to pH 2-2.5 by addition of $H_2SO_4$. After maturing, the lignin slurry was transferred to the test filter equipment. The suspension was filtered at constant pressure and the filtration time and filtrate weight was recorded during the whole filtration, and displacement washed with wash liquid (water, pH-adjusted to 2).

For the production of reduced odorous lignin (Sample 2) a third the step was added where the washed lignin cake was re-dissolved in water and NaOH at a pH of 12.5 and with an addition of 20% EtOH (w/w calculated on lignin). After maturing, the pH was adjusted to 2.5 by addition of $H_2SO_4$. The new lignin suspension was transferred to the test filter equipment. The suspension was filtered at constant pressure and the filtration time and filtrate weight was recorded during the whole filtration, and displacement washed with wash liquid (water, pH-adjusted to 2).

The filtered lignin cakes were dried for about one hour at a temperature of 80° C. in a heating chamber to remove the remaining alcohol from the samples. The reference sample was treated similarly. Samples were then analyzed with regard to the concentration of guaiacol by means of a "Head space analysis" which means that gases having a high vapour pressure were captured and these gases were then injected and separated in a gas chromatography apparatus. A mass spectrometer was used as a detector to ensure the identity of the odorous substances. In the table, a from cake build up (m/kg) corresponds to filtration resistance.

From Table 1 below it can be seen that the sample treated according to the present method had an odour reduction of 73%, calculated as the reduction of the peak area of the odorous compounds (mainly guaiacol) in the treated sample compared with the peak area of those compounds from the reference. Sample 1 is an untreated LignoBoost® lignin used as a reference.

TABLE 1

| Experiment | Mixing of wash-slurry Weight of dry lignin (g) | Lignin DS in slurry (w/w) | Cake build-up & washing pH filtrate (Washing) | α from cake build-up (m/kg) | α from washing (m/kg) | Mixing of wash-slurry Weight of dry lignin (g) | Temperature resuspension (° C.) | Added NaOH (5.0M) (g) | EtOH % (w/w lignin) |
|---|---|---|---|---|---|---|---|---|---|
| Reference | 14.4 | 14.1% | 2.4 | 2.13E+11 | 3.54E+11 | | | 0 | |
| Washed cake from second filtration reslurried with NaOH and EtOH. After 1 hour pH adjusted with H$_2$SO$_4$. | 14.5 | 13.4% | 2.4 | 6.0E+11 | 1.1E+12 | 11.6 | 50 | 14.4 | 20 |

| Experiment | Added Acid (6M H$_2$SO$_4$) | Lignin DS in slurry (w/w) | Yield (w/w) | pH filtrate (Washing) | Weight of dry filter cake excl co (g) | α from cake build-up (m/kg) | α from washing (m/kg) | Odour reduction % |
|---|---|---|---|---|---|---|---|---|
| Reference | | | 103.00% | | | | | 0 |
| Washed cake from second filtration reslurried with NaOH and EtOH. After 1 hour pH adjusted with H$_2$SO$_4$. | 8 | 7.4% | 89.5% | 2.1 | 9.4 | 6.0E+11 | 1.1E+12 | 73 |

It is clear to the skilled person in the art that the invention may be varied in many ways within the scope of the appended claims. The examples and embodiments above are not intended to limit the scope of the invention in any way. Instead the invention may be varied within the scope of the appended claims.

The invention claimed is:

1. A method of producing lignin with reduced amount of odorous substances comprising the steps of:
   i) dissolving isolated lignin into an alkali solution;
   ii) adding to the solution a $C_1$-$C_4$-alcohol in an amount of less than 30% by weight, based on the dry weight of the isolated lignin; and
   iii) re-precipitating lignin by acidifying the solution.

2. The method according to claim 1 further comprising the steps of:
   iv) dewatering and/or filtrating the re-precipitated lignin;
   v) washing the re-precipitated lignin; and
   vi) drying the re-precipitated lignin.

3. The method according to claim 1, wherein the isolated lignin in step i) is lignin that was isolated from black liquor in an alkaline chemical pulping process.

4. The method according to claim 3, wherein the isolated lignin was obtained from a process comprising the steps of:
   a) precipitating lignin by acidifying black liquor obtained from the alkaline chemical pulping process;
   b) dewatering and/or filtrating the obtained lignin to provide a filter cake;
   c) re-suspending the lignin;
   d) adjusting the pH of the obtained suspension in step c) to a pH lower than 6;
   e) dewatering and/or filtrating the acidic suspension from step d) to provide a filter cake; and
   f) washing and dewatering the filter cake.

5. The method according to claim 4, wherein the process from which the isolated lignin was obtained further comprises, prior to the step a), a pre-step in which black liquor is fractionated by filtration or by means of different pH-levels.

6. The method according to claim 4, wherein the process from which the isolated lignin was obtained further comprises the step of:
   (g) drying the filter cake.

7. The method according to claim 4, wherein the process from which the isolated lignin was obtained further comprises the step of:
   (h) adding another $C_1$-$C_4$-alcohol in an amount of less than 30% by weight, based on the dry weight of the isolated lignin, prior to, during or after precipitation in step a), and/or adding a further $C_1$-$C_4$-alcohol prior to, during or after at least one of the dewatering and/or washing steps b), e) and f) to reduce the amount of odorous substances.

8. The method according to claim 1, wherein the $C_1$-$C_4$-alcohol is added in an amount of 0.5 to 20% by weight, based on the dry weight of the isolated lignin.

9. The method according to claim 1, wherein the isolated lignin in step i) is lignin that was obtained from kraft pulping process.

10. The method according to claim 1, wherein the yield of the re-precipitated lignin obtained in step iii) is over 80% by weight, based on the weight of the isolated lignin in step i).

11. The method according to claim 1, wherein the odorous substances comprise at least one of dimethydisulphide, dimethyltrisulphide, dimethyltetrasulphide, guaiacol, ethylguaiacol and other phenolic compounds.

12. The method according to claim 1, wherein the concentration of the odorous substances is reduced by at least 50%, the concentration being calculated from a peak area of a respective peak in a chromatogram.

13. The method according to claim 1, wherein the method further comprises at least partially recirculating the $C_1$-$C_4$-alcohol, such that at least a portion of the $C_1$-$C_4$-alcohol has been used previously in steps i) through iii).

14. The method according to claim 1, wherein the $C_1$-$C_4$-alcohol is ethanol.

* * * * *

UNITED STATES PATENT AND TRADEMARK OFFICE
CERTIFICATE OF CORRECTION

PATENT NO. : 9,617,393 B2  
APPLICATION NO. : 14/940376  
DATED : April 11, 2017  
INVENTOR(S) : Per Tomani et al.

Page 1 of 1

It is certified that error appears in the above-identified patent and that said Letters Patent is hereby corrected as shown below:

In the Specification

At Column 1, Line 15 - Replace "Bonds lignin" with --Bonds linking lignin--

At Column 5, Line 27 - Replace "0%" with --20%--

At Column 6, Line 67 - Replace "2-15" with --2-2.5--

Signed and Sealed this  
Twenty-seventh Day of June, 2017

Joseph Matal  
*Performing the Functions and Duties of the*  
*Under Secretary of Commerce for Intellectual Property and*  
*Director of the United States Patent and Trademark Office*